United States Patent
Zimmer et al.

(10) Patent No.: US 10,054,077 B2
(45) Date of Patent: Aug. 21, 2018

(54) METHOD FOR OPERATING A FUEL INJECTOR

(71) Applicant: Robert Bosch GmbH, Stuttgart (DE)

(72) Inventors: Hanna Zimmer, Stuttgart Zuffenhausen (DE); Stephan Olbrich, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/525,109

(22) PCT Filed: Nov. 11, 2015

(86) PCT No.: PCT/EP2015/076332
§ 371 (c)(1),
(2) Date: May 8, 2017

(87) PCT Pub. No.: WO2016/091520
PCT Pub. Date: Jun. 16, 2016

(65) Prior Publication Data
US 2017/0321621 A1 Nov. 9, 2017

(30) Foreign Application Priority Data
Dec. 11, 2014 (DE) .......... 10 2014 225 530

(51) Int. Cl.
*F02D 41/40* (2006.01)
*F02D 41/20* (2006.01)

(52) U.S. Cl.
CPC ...... *F02D 41/40* (2013.01); *F02D 2041/2055* (2013.01); *F02D 2200/063* (2013.01); *F02D 2250/04* (2013.01)

(58) Field of Classification Search
CPC .............. F02D 41/40; F02D 2200/063; F02D 2041/2055; F02D 2250/04
See application file for complete search history.

(56) References Cited

U.S. PATENT DOCUMENTS

2006/0283425 A1* 12/2006 Tsutsui ............... F02D 41/3836
123/478
2009/0178474 A1 7/2009 Bailey

FOREIGN PATENT DOCUMENTS

| DE | 19733897 A1 | 2/1998 |
|----|---|---|
| DE | 10302806 A1 | 8/2004 |
| DE | 102006032547 A1 | 1/2008 |

(Continued)

OTHER PUBLICATIONS

International Search Report dated Feb. 8, 2016, of the corresponding International Application PCT/EP2015/076332 filed Nov. 11, 2015.

*Primary Examiner* — Hung Q Nguyen
*Assistant Examiner* — Xiao Mo
(74) *Attorney, Agent, or Firm* — Norton Rose Fulbright US LLP; Gerard Messina

(57) ABSTRACT

A method for operating a fuel injector having at least one injection orifice that is controlled by an injector needle, in which pressure variations during the opening and/or closing of the injector needle are ascertained with the aid of a sensor. In order to determine the opening/closing instant of the injector needle, a variable that characterizes the velocity of sound of a pressure wave by the opening and/or closing is measured, and the wave propagation time, by which the needle or valve opening/closing instant is corrected, is inferred therefrom.

7 Claims, 2 Drawing Sheets

(56) References Cited

FOREIGN PATENT DOCUMENTS

| | | |
|---|---|---|
| DE | 102011090004 A1 | 7/2013 |
| DE | 102012206586 A1 | 10/2013 |
| WO | 2004063547 A1 | 7/2004 |

\* cited by examiner

METHOD FOR OPERATING A FUEL INJECTOR

FIELD

The present invention relates to a method for operating a fuel injector. In addition, the present invention relates to a computer program that is designed to execute each step of the method according to the present invention, as well as to a machine-readable memory medium on which the computer program according to the present invention is stored. Finally, the present invention relates to an electronic control unit which is designed to execute the method for operating a fuel injector.

BACKGROUND INFORMATION

A method for operating a fuel injector is described in German Patent Application No. DE 10 2012 206 586 A1. The fuel injector has at least one injection orifice which is controlled by an injector needle, and a control space for the injector needle, which communicates with a high-pressure side and a low-pressure side of the fuel injector; using a control-valve system, a closing pressure at which the injector needle is positioned in a closing position that seals the injection orifice, and an opening pressure, at which the injector needle transitions into an open position that releases the injection orifice, are adjustable in the control space, and pressure changes during the opening and/or closing of the injector needle are ascertained with the aid of a sensor.

In order to provide a precise control of the injection quantity of such a fuel injector in a manner that requires limited resources, a dynamic pressure in the fuel injector is sensed with the aid of the sensor, which preferably is a force and/or pressure sensor. Utilizing such a pressure sensor, which is normally developed as a piezo sensor or a resistance strain gauge (RSG), the pressure in the high-pressure bore is measured and recorded so that an opening or closing operation of the needle may be detected. The signal curve is used to ascertain the instants for the opening and/or closing of the injector needle or the valve. The time between the event of the opening/closing of the injector needle or the valve and its detection is now a function of the propagation time of a pressure wave from the event to the sensor. This wave propagation time is in turn dependent upon the temperature, the pressure of the fuel and the fuel type, for instance. Small delay times in the detection of the opening/closing operation may make a control on that basis imprecise, which could have a detrimental effect on the operation of the internal combustion engine and especially its emissions.

Therefore, it is desired to ensure a chronologically correct detection even if the wave propagation time varies, e.g., on account of the pressure, the temperature or the type of fuel.

SUMMARY

An example method in accordance with the present invention may have the advantage that the opening/closing time of the injector needle or the valve is able to be determined very precisely inasmuch as pressure changes during the opening and/or closing of the injector needle or the switching valve are ascertained. This is done with the aid of a variable that characterizes the velocity of sound, the variable being used for correcting the opening/closing instant of the injector needle or the switching valve by the wave-propagation time from the injector needle or the switching valve to the sensor. The velocity of sound of the signal-conducting medium may change during the operation as a function of the fuel type, temperature influences and the like. Thus, a variable that characterizes the velocity of sound also represents the influences of the fuel type, the temperature and the like. Factoring in the wave propagation time from the injector needle or the switching valve to the sensor allows for a more precise determination of the opening/closing instant of the injector needle or the switching valve.

Advantageous further refinements and improvements of the method are described herein. For example, an advantageous further refinement provides that the variable characterizing the velocity of sound be calculated on the basis of the frequency of a natural oscillation induced by the needle opening/closing.

According to an advantageous further refinement, the frequency of the natural oscillation is ascertained with the aid of a Fast-Fourier transformation (FFT).

According to another advantageous further refinement, the frequency of the natural oscillation is ascertained from the wavelength.

Preferably, it is provided that the correlation between the variable that characterizes the velocity of sound and the wave propagation time from the injector needle or the switching valve to the sensor is stored in a characteristics map. This characteristics map is preferably determined empirically. The characteristics map reflects the correlation between the variable characterizing the velocity of sound and the wave propagation time from the injector needle or the switching valve to the sensor. The variable characterizing the velocity of sound is determined by detecting the pressure wave induced by an opening/closing of the needle.

The computer program according to the present invention is designed to execute each step of the method, in particular when it is running on a computing device or a control unit. It allows the implementation of the method according to the present invention on an electronic control unit without having to undertake structural modifications on the device. The machine-readable memory medium, on which the computer program according to the present invention is stored, is provided for this purpose. The electronic control unit according to the present invention that is designed to execute the method of the present invention is obtained by installing the computer program according to the present invention on an electronic control unit.

BRIEF DESCRIPTION OF THE DRAWINGS

Exemplary embodiments of the present invention are shown in the figures and described in greater detail below.

DETAILED DESCRIPTION OF EXAMPLE EMBODIMENTS

Figure 1:
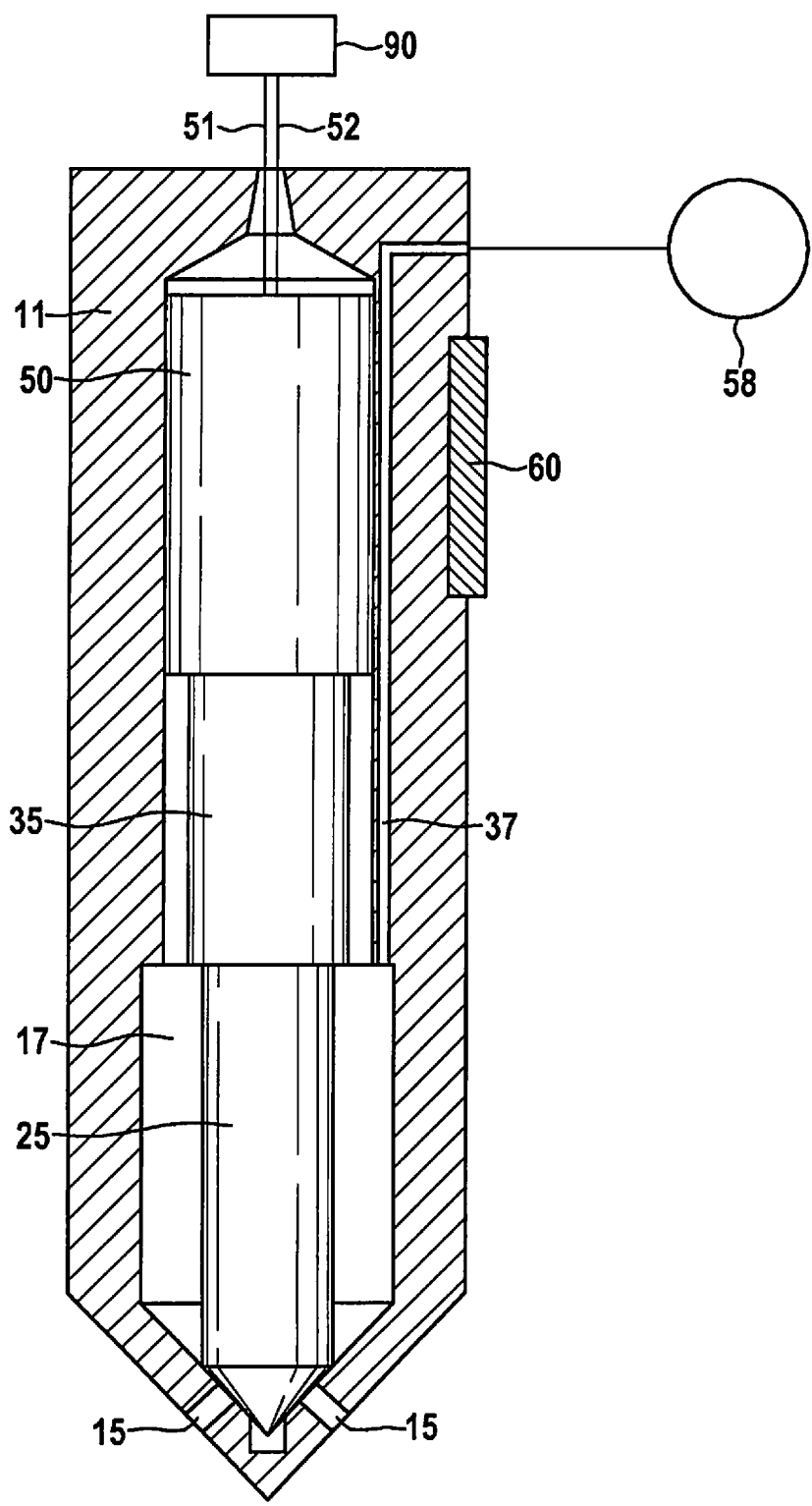
FIG. 1 shows a fuel injector that uses the method according to the present invention, in a schematic representation.

In a highly schematic representation and omitting features that are not relevant to the present invention, FIG. 1 shows a fuel injector from German Patent Application No. DE 10 2014 204 746 A1, to which reference is made herein, and which is expressly incorporated herein by reference in its entirety. A nozzle needle, hereinafter also referred to as injector needle 25, is situated inside an injector housing 11. In the lowered position (as shown), injection orifices 15 are closed, and in its raised position, injection orifices 15 are released for the injection of fuel into a combustion chamber of the internal combustion engine (not shown). The fuel is conveyed from a high-pressure accumulator 58, also known as a common rail, via an inlet bore 37 to a high-pressure chamber 17. With the aid of a piezo actuator 50, injector needle 25 is actuated via a coupler piston 35 in a conventional manner as described in German Patent Application No. DE 10 2014 204 746 A1. A control unit 90 controls piezo actuator 50, for which purpose connection lines 51, 52 are routed to piezo actuator 50. The pressure of the fuel prevailing in inlet bore 37 is acquired with the aid of a sensor 60, which is situated in the upper region of housing 11 of the piezo fuel injector.

This sensor 60 may be a piezo sensor, for example. In addition, a sensor in the form of a resistance strain gauge (RSG) is possible as well.

An event such as the needle opening now triggers a pressure wave. This pressure wave propagates along high-pressure bore 57 to sensor 60. This wave propagation time must be taken into account in order to detect the exact needle opening instant.

The example method according to the present invention for operating such a fuel injector provided with at least one injection orifice 15 that is controlled by an injector needle 25, now makes it possible to ensure a chronologically correct detection even if the wave propagation time varies, e.g., on account of the pressure, temperature or fuel. Toward that end, the velocity of sound or a substitute variable, i.e., a variable that characterizes the velocity of sound, is measured. This is done by measuring the frequency of a natural oscillation and by calculating the velocity of sound on this basis. The advantage of the method of the present invention is that the wave propagation time in the presence of different fuels, temperatures and pressures is able to be compensated for, so that it possible to detect the injection period more precisely.

A pressure wave triggered by the needle opening, for instance, propagates along high-pressure bore 37 to sensor 60. The time during which the wave is traveling depends on the length of the distance and the velocity of sound of the medium in high-pressure bore 37. For example, the velocity of sound is a function of the temperature, the pressure and the fuel characteristics, such as the bulk modulus and the density of the fuel. A precise detection of the needle opening requires a compensation of the propagation time, for instance. In dynamic operating states that are virtually the rule in vehicles, a determination of the current local velocity of sound via models is very difficult and correspondingly imprecise. A variable that characterizes the velocity of sound is therefore determined. For example, the frequency of a natural oscillation that is produced following the needle closing, for instance, is analyzed. This is preferably accomplished with the aid of a Fast-Fourier transformation (FFT). Instead of a Fourier transformation, the frequency of the natural oscillation may also be ascertained from the wavelength of the pressure wave. In other words, the frequency of a natural oscillation of the pressure wave, which is detected with the aid of sensor 60, is used to infer a variable that characterizes the velocity of sound, and from that, the wave propagation time from injector needle 25 or from the switching valve to sensor 60 is in turn inferred. In an advantageous manner, the correlation between the variable characterizing the velocity of sound and the wave propagation time from nozzle needle 25 to sensor 60 is stored in a characteristics map which is able to be ascertained empirically, for instance.

Figure 2:
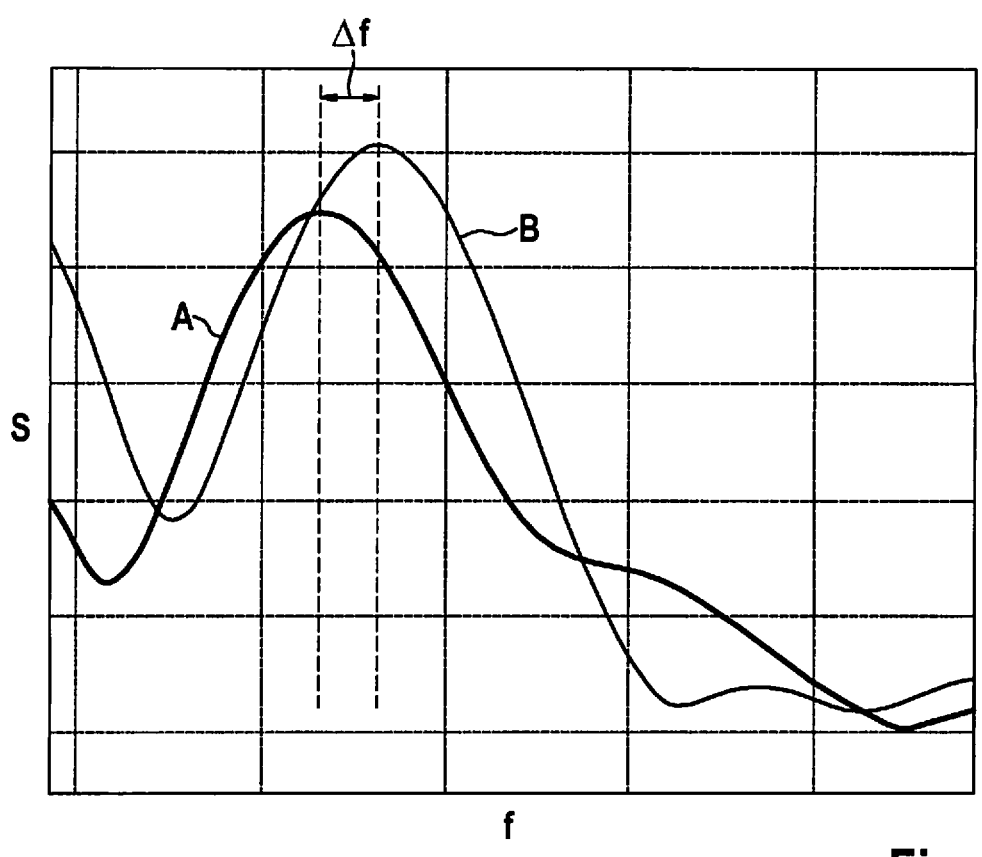
FIG. 2 shows frequency spectrums as signals over the frequency to illustrate the pressure-dependent frequency shift, in a schematic representation.

FIG. 2 schematically illustrates a frequency spectrum at a pressure of 1200 bar, characterized by A, and a frequency spectrum at a pressure of 2000 bar, characterized by B. Signal S over frequency f indicates that the frequency spectrum is shifted by a difference Δf at a higher pressure in comparison with the frequency spectrum at a lower pressure. This frequency of the natural oscillation produced by the closing of the needle, which represent the maxima in FIG. 2, is evaluated.

With the aid of a characteristics map, Δf may be used to determine a Δt by which the needle opening/closing instant is corrected. The corrected needle opening/closing instant is compared to the setpoint opening/closing instant. In case of deviations, the activation is appropriately corrected; here, too, a characteristics map is advantageously utilized to do so.

What is claimed is:

1. A method for operating a fuel injector having at least one injection orifice that is controlled by an injector needle, the method comprising:
    ascertaining, with the aid of a sensor, pressure variations in the fuel injector during opening and/or closing of the injector needle or a switching valve;
    measuring and evaluating a variable that characterizes a velocity of sound of a pressure wave triggered by the opening and/or closing, in order to determining an opening/closing instant of the injector needle or the injection valve; and
    using the variable to correct the opening/closing instant of injector needle or the switching valve using wave propagation time from the injector needle or the switching valve to the sensor.

2. The method as recited in claim 1, wherein the variable characterizing the velocity of sound is calculated on the basis of a frequency of a natural oscillation induced by the needle opening/closing.

3. The method as recited in claim 2, wherein the frequency of the natural oscillation is ascertained with the aid of a Fast-Fourier transformation (FFT).

4. The method as recited in claim 2, wherein the frequency of the natural oscillation is ascertained from a wavelength of the pressure wave.

5. The method as recited in claim 2, wherein a correlation between the variable characterizing the velocity of sound and the wave propagation time from the injector needle or the switching valve to the sensor is stored in a characteristics map.

6. A non-transitory machine-readable memory medium on which is stored a computer program for operating a fuel injector having at least one injection orifice that is controlled by an injector needle, the computer program, when executed by a computer, causing the computer to perform:
    ascertaining, with the aid of a sensor, pressure variations in the fuel injector during opening and/or closing of the injector needle or a switching valve;
    measuring and evaluating a variable that characterizes a velocity of sound of a pressure wave triggered by the opening and/or closing, in order to determining an opening/closing instant of the injector needle or the injection valve; and
    using the variable to correct the opening/closing instant of injector needle or the switching valve using wave propagation time from the injector needle or the switching valve to the sensor.

7. An electronic control unit for operating a fuel injector, the electronic control unit designed to:

ascertain, with the aid of a sensor, pressure variations in the fuel injector during opening and/or closing of the injector needle or a switching valve;

measure and evaluate a variable that characterizes a velocity of sound of a pressure wave triggered by the opening and/or closing, in order to determining an opening/closing instant of the injector needle or the injection valve; and use the variable to correct the opening/closing instant of injector needle or the switching valve using wave propagation time from the injector needle or the switching valve to the sensor.

* * * * *